United States Patent
Ma et al.

(10) Patent No.: US 7,090,793 B2
(45) Date of Patent: Aug. 15, 2006

(54) PREPARATION OF FUEL CELL COMPOSITE BIPOLAR PLATE

(75) Inventors: Chen-Chi Martin Ma, Hsinchu (TW); Ken Hung Chen, Hsinchu (TW); Hsu Chiang Kuan, Hsinchu (TW); Shih Ming Chen, Hsinchu (TW); Ming Huang Tsai, Hsinchu (TW); Yi Yie Yan, Hsinchu (TW); Fanghei Tsau, Hsinchu (TW)

(73) Assignees: Industrial Technology Research Institute, Hsinchu (TW); National Tsing Hua University, Hsinchu (TW)

( * ) Notice: Subject to any disclaimer, the term of this patent is extended or adjusted under 35 U.S.C. 154(b) by 0 days.

(21) Appl. No.: 10/809,356

(22) Filed: Mar. 26, 2004

(65) Prior Publication Data
US 2005/0001352 A1 Jan. 6, 2005

(51) Int. Cl.
*B29C 70/88* (2006.01)
*H01B 1/20* (2006.01)

(52) U.S. Cl. ........................ 264/105; 264/128; 264/130; 264/319; 264/331.18; 252/511; 252/512

(58) Field of Classification Search ................ 264/104, 264/105, 128, 130, 319, 331.18; 252/511, 252/512; 427/115
See application file for complete search history.

(56) References Cited

U.S. PATENT DOCUMENTS

| | | | |
|---|---|---|---|
| 5,882,570 A * | 3/1999 | Hayward | 264/328.18 |
| 6,217,800 B1 * | 4/2001 | Hayward | 264/29.1 |
| 6,248,467 B1 * | 6/2001 | Wilson et al. | 429/39 |
| 6,436,315 B1 * | 8/2002 | Butler | 252/511 |
| 6,752,937 B1 * | 6/2004 | Butler | 252/511 |
| 2001/0006263 A1 * | 7/2001 | Hayward | 264/29.1 |
| 2002/0127457 A1 * | 9/2002 | Trapp et al. | 429/34 |
| 2003/0044483 A1 * | 3/2003 | Cabak | 425/449 |

* cited by examiner

*Primary Examiner*—Angela Ortiz
(74) *Attorney, Agent, or Firm*—Bacon & Thomas, PLLC

(57) ABSTRACT

A composite bipolar plate of polymer electrolyte membrane fuel cells (PEMFC) is prepared as follows: a) preparing a bulk molding compound (BMC) material containing a vinyl ester resin and a graphite powder, the graphite powder content of BMC material ranging from 60 wt % to 80 wt %, based on the compounded mixture; b) molding the BMC material from step a) to form a bipolar plate having a desired shape at 80–200° C. and 500–4000 psi, wherein the graphite powder is of 40 mesh–80 mesh.

16 Claims, No Drawings

PREPARATION OF FUEL CELL COMPOSITE BIPOLAR PLATE

FIELD OF THE INVENTION

The present invention relates to a method for preparing a fuel cell composite bipolar plate, particularly a method for preparing a polymer/graphite composite bipolar plate for a fuel cell by a bulk molding compound (BMC) process.

BACKGROUND OF THE INVENTION

Taiwan Patent Publication No. 399348 discloses a method for preparing a bipolar plate, which comprises: mixing at least an electrically conductive material, at least a resin, and at least a hydrophilic agent suitable for a proton exchange membrane fuel cell, to form a substantially homogeneous mixture wherein, based on the weight of said mixture, said at least an electrically conductive material is about 50% to about 95% and said at least a resin is about 5%; and molding said mixture to form a bipolar plate with a desired shape at a temperature of about 250° C. to about 500° C. and a pressure of about 500 psi to about 4000 psi, wherein said at least a resin is selected from the group consisting of thermosetting resins, thermoplastic resins, and a mixture thereof, and said at least an electrically conductive material is selected from the group consisting of graphite, carbon black, carbon fiber, and a mixture thereof.

U.S. Pat. No. 6,248,467 discloses a fuel cell composite bipolar plate, wherein the particle size of the graphite powder is mainly in the range of 80 mesh–325 mesh. This patent has mentioned that the mixing of the resin becomes inhomogeneous during processing when the particle size of the graphite powder is larger than 150 μm.

WO 00/57506 discloses a highly conductive molding composition for molding a fuel cell bipolar plate, wherein the particle size of the graphite powder used is mainly in the range of 44 μm to 150 μm, wherein the amount of the graphite powder larger than 150 μm needs to be lower than 10%, and the amount of the graphite powder smaller than 44 μm also needs to be lower than 10%.

To this date, the industry is still continuously looking for a fuel cell bipolar plate having a high electric conductivity, excellent mechanical properties, and a high thermal stability.

SUMMARY OF THE INVENTION

One primary objective of the present invention is to provide a fuel cell bipolar plate having a high electrical conductivity, excellent mechanical properties, and a high thermal stability.

Another objective of the present invention is to provide a method for preparing a fuel cell bipolar plate having a high electrical conductivity, excellent mechanical properties, and a high thermal stability.

According to the present invention, a composite bipolar plate is produced by a bulk molding compound (BMC) process using a vinyl ester resin and an electrically conductive carbon material, wherein a suitable example of said electrically conductive carbon material is graphite, and the particle size of graphite needs to be larger than 80 mesh. A composite bipolar plate according to the present invention has an increased electric conductivity, increased mechanical properties, while meeting flame retardant and corrosion resistance demands.

After many trial and errors, the present invention has discovered that the particle size of graphite powder needs to be larger than 80 mesh (over 177 μm in diameter) such that a high performance fuel cell vinyl ester resin/graphite composite bipolar plate can be produced by a BMC process. When the particle size of the graphite powder is smaller than 80 mesh, as had been taught in prior arts, e.g. in the range of 200 mesh~270 mesh, the present invention has discovered that a problem of non-homogeneous mixing between the graphite powder and the vinyl ester resin is liable to occur during the processing. In particular, when the particle size of the graphite powder becomes even smaller, the electrical and mechanical properties of a composite bipolar plate formed by a BMC process become conspicuously poorer.

DETAILED DESCRIPTION OF THE INVENTION

Preferred embodiments of the present invention includes (but not limited to) the following:

1. A method for preparing a fuel cell composite bipolar plate, which comprises:

a) compounding a mixture comprising a graphite powder and a vinyl ester resin to form a homogeneous bulk molding compound material, wherein said material comprises 60 to 80 wt % of said graphite powder, based on the weight of said material;

b) molding the material from step a) to form a bipolar plate having a desired shape at 80–200° C. and 500–4000 psi;

wherein particles of said graphite powder have a size of 10–80 mesh.

2. The method as recited in Item 1, wherein less than 10 wt % of the particles of the graphite powder are larger than 40 mesh, and the remaining particles of the graphite powder have a size of 40–80 mesh.

3. The method as recited in Item 1, wherein said mixture in step (a) further comprises a free radical initiator in an amount of 1–10% based on the weight of said vinyl ester resin.

4. The method as recited in Item 3, wherein said free radical initiator is selected from the group consisting of peroxide, hydroperoxide, azonitrile, redox systems, persulfates, and perbenzoates.

5. The method as recited in Item 4, wherein said free radical initiator is t-butyl peroxybenzoate.

6. The method as recited in Item 1, wherein said mixture in step a) further comprises a mold releasing agent in an amount of 1–10%, based on the weight of said vinyl ester resin.

7. The method as recited in Item 6, wherein said mold releasing agent is wax or metal stearate.

8. The method as recited in Item 7, wherein said mold releasing agent is metal stearate.

9. The method as recited in Item 1, wherein said mixture in step a) further comprises a low shrinking agent in an amount of 5–20%, based on the weight of said vinyl ester resin.

10. The method as recited in Item 9, wherein said low shrinking agent is selected from the group consisting of styrene-monomer-diluted polystyrene resin, copolymer of styrene and acrylic acid, poly(vinyl acetate), copolymer of vinyl acetate and acrylic acid, copolymer of vinyl acetate and itaconic acid, and terpolymer of vinyl acetate, acrylic acid and itaconic acid.

11. The method as recited in Item 10, wherein said low shrinking agent is styrene-monomer-diluted polystyrene resin.

12. The method as recited in Item 1, wherein said mixture in step a) further comprises a tackifier in an amount of 1–10%, based on the weight of said vinyl ester resin.

13. The method as recited in Item 12, wherein said tackifier is selected from the group consisting of alkaline earth metal oxides, alkaline earth metal hydroxides, carbodiamides, aziridines, and polyisocyanates.

14. The method as recited in Item 13, wherein said tackifier is calcium oxide or magnesium oxide.

15. The method as recited in Item 1, wherein said mixture in step a) further comprises a solvent in an amount of 10–35%, based on the weight of said vinyl ester resin.

16. The method as recited in Item 15, wherein said solvent is selected from the group consisting of styrene monomer, alpha-methyl styrene monomer, chloro-styrene monomer, vinyl toluene monomer, divinyl toluene monomer, diallylphthalate monomer, and methyl methacrylate monomer.

17. The method as recited in Item 16, wherein said solvent is styrene monomer.

18. The method as recited in Item 1, wherein said vinyl ester is selected from the group consisting of bisphenol-A epoxy-based methacrylate, bisphenol-A epoxy-based acrylate, tetrabromo bisphenol-A epoxy-based methacrylate, and phenol-novolac epoxy-based methacrylate.

19. The method as recited in Item 1, wherein said vinyl ester resin has a molecular weight of 500–10000.

20. The method as recited in Item 18, wherein said vinyl ester resin is phenol-novolac epoxy-based methacrylate.

The vinyl ester resins used by the present invention have been described in U.S. Pat. No. 6,248,467 which are (meth) acrylated epoxy polyesters, preferably having a glass transition temperature (Tg) of over 180° C. Suitable examples of said vinyl ester resins include, but not limited to, bisphenol-A epoxy-based methacrylate, bisphenol-A epoxy-based acrylate, tetrabromo bisphenol-A epoxy-based methacrylate, and phenol-novolac epoxy-based methacrylate. Said vinyl ester resins have a molecular weight of about 500~10000, and an acid value of about 4 mg/1hKOH–40 mg/1hKOH.

In the following examples and controls, the vinyl ester resins and initiators used are:

Vinyl ester resin: phenolic-novolac epoxy-based (methacrylate) resin having the following structure, which is available as code SW930-10 from SWANCOR IND. CO., LTD, No. 9, Industry South 6 Rd, Nan Kang Industrial Park, Nan-Tou City, Taiwan:

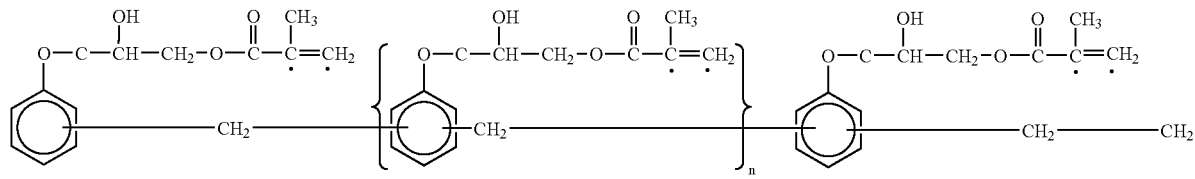

wherein n=1~3.

Initiator: t-Butyl peroxybenzoate (TBPB) having the following structure, which is available as code TBPB-98 from Taiwan Chiang-Ya Co, Ltd., 4 of 8$^{th}$ Fl, No. 345, Chunghe Rd, Yuianhe City, Taipei Hsien:

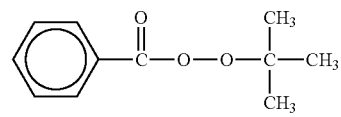

EXAMPLE 1

The graphite powder used in this example consisted of not more than 10% of particles larger than 40 mesh (420 μm in diameter), about 40% of particles between 40 mesh and 60 mesh (420–250 μm in diameter), and about 50% of particles between 60 mesh and 80 mesh (250–177 μm in diameter).

Preparation of BMC Material and Specimen 1. 500 g of a solution was prepared by dissolving 375 g of polyethylene resin and 42 g of styrene-monomer-diluted polystyrene (as a low shrinking agent) in 83 g of styrene monomer as a solvent. 9 g of TBPB was added as an initiator, 9 g of MgO was added as a tackifier, and 17.5 g of zinc stearate was added as a mold releasing agent.

2. The abovementioned solution was agitated in a motorized mixer at room temperature for 30 minutes.

3. The abovementioned solution and 1500 g of graphite powder were poured into a Bulk Molding Compound (BMC) kneader to be mixed homogeneously by forward-and-backward rotations for a kneading time of about 30 minutes. The kneading operation was stopped and the mixed material was removed from the mixer to be tackified at room temperature for 48 hours.

4. Prior to thermal compression of specimens, the material was divided into several lumps of molding material with each lump weighing 60 g.

5. A slab mold was fastened to the upper and lower platforms of a hot press. The pre-heating temperature of the molds were set to 140° C. After the temperature had reached the set point, the lump was disposed at the center of the molds and pressed with a pressure of 1000 psi to form a specimen. After 600 seconds, the mold was opened automatically, and the specimen was removed.

Control 1-4:

The steps in Example 1 were repeated to prepare lumps of molding material and specimens with different particle sizes of the graphite powder:

The particle size of the graphite powder for Control 1 was 80 mesh ~120 mesh;

The particle size of the graphite powder for Control 2 was 120 mesh ~200 mesh;

The particle size of the graphite powder for Control 3 was 200 mesh ~270 mesh;

The particle size of the graphite powder for Control 4 was smaller than 270 mesh, i.e. can pass a sieve having a mesh number >270 mesh.

Electrical Properties:

Test Method:

A four-point probe resistivity meter was used by applying a voltage and an electric current on the surface of a specimen at one end, measuring at the other end the voltage and the electric current passed through the specimen, and using the Ohm's law to obtain the volume resistivity (.) of the specimen according to the formula, $$\rho = \frac{V}{I} * W * CF, \quad \text{(formula 1)}$$

wherein

V is the voltage passed through the specimen, I is the electric current passed through the specimen, a ratio thereof is the surface resistivity, W is the thickness of the specimen, and CF is the correction factor. The thermally compressed specimens from the example and the controls were about 100 mm×100 mm with a thickness of 3 mm. The correction factor (CF) for the specimens was 4.5. Formula 1 was used to obtain the volume resistivity (.) and an inversion of the volume resistivity is the electric conductivity of a specimen.

Results:

Table 1 shows the test results of resistivity for polymer composite bipolar plates prepared by a constant resin formula, 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured resistivities separately were 6.5 m., 10.1 m., 17.8 m., 21.3 m., and 25.2 m. The results indicated that the smaller the particle size of graphite is, the larger is the measured resistivity. The resistivity of the graphite particles with a particle size <80 mesh is about four times of the resistivity of the graphite particles with a particle size >270 mesh.

Table 2 shows the test results of electric conductivity for polymer composite bipolar plates prepared by a constant resin formula, 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured electric conductivities separately were 114 S/cm, 73 S/cm, 42 S/cm, 35 S/cm, and 29 S/cm. The results indicated that the smaller the particle size of graphite is, the smaller is the measured electric conductivity. The electric conductivity of the graphite particles with a particle size <80 mesh is about four times of the electric conductivity of the graphite particles with a particle size >270 mesh.

TABLE 1

| | Particle size of graphite (mesh) | Resistivity (m.) |
|---|---|---|
| Example 1 | <80 | 6.5 |
| Control 1 | 80~120 | 10.1 |

TABLE 1-continued

| | Particle size of graphite (mesh) | Resistivity (m.) |
|---|---|---|
| Control 2 | 120~200 | 17.8 |
| Control 3 | 200~270 | 21.3 |
| Control 4 | >270 | 25.2 |

TABLE 2

| | Particle size of graphite (mesh) | Electric conductivity (S/cm) |
|---|---|---|
| Example 1 | <80 | 114 |
| Control 1 | 80~420 | 73 |
| Control 2 | 120~200 | 42 |
| Control 3 | 200~270 | 35 |
| Control 4 | >270 | 29 |

Mechanical property: Test for flexural strength

Method of test: ASTM D790

Results:

Table 3 shows the test results of flexural strength for polymer composite bipolar plates prepared by using 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured flexural strength separately were 33.25 MPa, 25.24 MPa, 20.85 MPa, 17.93 MPa, 15.96 MPa. The measured flexural moduluss separately were 6923 MPa, 5980 MPa, 5636 MPa, 5071 MPa, and 4585 Mpa. Along with a decrease in the particle size of graphite, the measured flexural property also decreases (i.e. a decrease in the measured flexural strength and the measured flexural modulus).

TABLE 3

| | Particle size of graphite (mesh) | Flexural strength (MPa) | Flexural modulus (MPa) |
|---|---|---|---|
| Example 1 | <80 | 31.25 | 6923 |
| Control 1 | 80~420 | 25.24 | 5980 |
| Control 2 | 120~200 | 20.85 | 5636 |
| Control 3 | 200~270 | 17.93 | 5071 |
| Control 4 | >270 | 15.96 | 4585 |

Mechanical property: Test for impact strength

Method of test: ASTM D256

Results:

Table 4 shows the test results of impact strength (notched Izod impact test and notch-free Izod impact test) for polymer composite bipolar plates prepared by using 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured values of the notch-free Izod impact test were 0.50 (lb-ft/in), 0.38 (lb-ft/in), 0.36 (lb-ft/in), 0.33 (lb-ft/in), and 0.29 (lb-ft/in); and the measured values of the notched Izod impact test were 0.31 (lb-ft/in), 0.25 (lb-ft/in), 0.23 (lb-ft/in), 0.21 (lb-ft/in), and 0.18 (lb-ft/in). The measured impact strength decrease along with a decrease in the particle size of graphite.

TABLE 4

|  | Particle size of graphite (mesh) | Notched Izod impact strength (lb-ft/in) | Notch-free Izod impact strength (lb-ft/in) |
|---|---|---|---|
| Example 1 | <80 | 0.31 | 0.50 |
| Control 1 | 80~120 | 0.25 | 0.38 |
| Control 2 | 120~200 | 0.23 | 0.36 |
| Control 3 | 200~270 | 0.21 | 0.33 |
| Control 4 | >270 | 0.18 | 0.29 |

Corrosion property:

Method of test: ASTM G5–0.94

Results:

Table 5 shows the test results of corrosion resistance for polymer composite bipolar plates prepared by using 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured corrosion current values were all below $10^{-7}$ (Amps/cm$^2$) which indicate that all composite bipolar plates with a graphite powder content of 75 wt % all have an excellent corrosion resistance—regardless of the particle size of graphite.

TABLE 5

|  | Particle size of graphite (mesh) | Corrosion current value (Amps/cm$^2$) |
|---|---|---|
| Example 1 | <80 | $1.8 \times 10^{-9}$ |
| Control 1 | 80~120 | $9.0 \times 10^{-8}$ |
| Control 2 | 120~200 | $8.0 \times 10^{-8}$ |
| Control 3 | 200~270 | $7.5 \times 10^{-8}$ |
| Control 4 | >270 | $1.2 \times 10^{-7}$ |

Flame retardancy property: UL-94 test

Method of test: ASTM D-3801

Results:

A vertical combustion method specified in the flame retardancy standard was used, wherein the flame retardancy is classified into 94V-0, 94V-1 or 94V-2. During the testing, all specimens prepared in the example and controls did not drip and, therefore, did not cause a cotton ball to burn.

Table 6 shows the test results of flame retardancy for polymer composite bipolar plates prepared by using 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured flame retardancy for all composite bipolar plates with a graphite powder content of 75 wt % with a different particle size distribution all meet 94V-0 in the UL-94 test.

TABLE 6

|  | Particle size of graphite (mesh) | Dripping of molten material | Combustion of cotton | UL-94 standard |
|---|---|---|---|---|
| Example 1 | <80 | N/A[a] | N/A | 94V-0 |
| Control 1 | 80~120 | N/A | N/A | 94V-0 |
| Control 2 | 120~200 | N/A | N/A | 94V-0 |
| Control 3 | 200~270 | N/A | N/A | 94V-0 |
| Control 4 | >270 | N/A | N/A | 94V-0 |

[a]not measured

Property of flame retardancy: Test of Limit Oxygen Index, (LOI)

Method of test: ASTM D-2863

Results:

The Limit Oxygen Index (LOI) test is the most commonly used method for testing the flame retardancy property of a polymer substrate. Usually, the LOI is defined by the following formula:

$$LOI = \frac{[O_2]}{[O_2] + [N_2]} \times 100$$

wherein [O2] and [N2] separately are the volumetric flowrate (ml/sec) of oxygen and nitrogen. Usually, the relationship between the oxygen index and the combustion property is classified into the following three grades:

LOI≦21→combustible
LOI=22~25→self-extinguishing (not easy to burn)
LOI≧26→difficult to burn The LOI is used to determine the minimum oxygen concentration required for sustaining a flame in a mixture system of flowing oxygen and nitrogen in room temperature.

A vinyl ester resin with a high Tg value used in the example and controls had an LOI <21. Table 7 shows the test results of flame retardancy for polymer composite bipolar plates prepared by using 75 wt % of graphite powder, with different particle sizes of the graphite powder, wherein the diameter ranges of the particles separately were <80 mesh, 80 mesh~120 mesh, 120 mesh~200 mesh, 200 mesh~270 mesh, >270 mesh. The measured LOI for all composite bipolar plates with a graphite powder content of 75 wt % with a different particle size distribution are all larger than 50.

TABLE 7

|  | Particle size of graphite (mesh) | Dripping of molten material | Combustion of absorbent cotton | LOI |
|---|---|---|---|---|
| Example 1 | >80 | N/A[a] | N/A | >50 |
| Control 1 | 80~120 | N/A | N/A | >50 |
| Control 2 | 120~200 | N/A | N/A | >50 |
| Control 3 | 200~270 | N/A | N/A | >50 |
| Control 4 | 270< | N/A | N/A | >50 |

[a]not available

The compositions for the BMC porcess in the example and controls are all the same except that particle size distribution of the graphite powder is different. The graphite powder of Example 1 consists of not more than 10% of particles larger than 420 μm in diameter (<40 mesh), about 40% of particles between 40 mesh and 60 mesh (420 μm ~250 μm in diameter), and about 50% of particles between 60 mesh and 80 mesh (250 μm~177 μm in diameter). The particle size of the graphite powder in Control 2 is 120 mesh~200 mesh. The particle size of the graphite powder in Control 3 is 200 mesh~270 mesh. The particle size of the graphite powder for Control 4 is smaller than >270 mesh. The particle size of the graphite decreases monotonically from Example 1 to Control 1, Control 2, Control 3, and Control 4. For a formula with a smaller graphite particle, even though the content of the graphite powder is fixed at 75 wt %, the volumetric content thereof is relatively larger. Therefore, a graphite powder with a smaller particle size has a larger total surface area. Since the content of graphite is fixed at 75 wt %, the differences in the properties of the bipolar plate are merely caused by the total surface area of graphite powder. It is surprised that the greater the total surface area of graphite powder is the poorer the performance of the bipolar plate.

The invention claimed is:

1. A method for preparing a fuel cell composite bipolar plate, which comprises:
   a) compounding a mixture comprising a graphite powder, and a vinyl ester resin, a mold releasing agent in an amount of 1–10%, based on the weight of said vinyl ester resin, and a solvent in an amount of 10–35%, based on the weight of said vinyl ester resin to form a homogeneous bulk molding compound material, wherein said material comprises 60 to 80 wt % of said graphite powder, based on the weight of said material;
   b) molding the material from step a) to form a bipolar plate having a desired shape at 80–200° C. and 500–4000 psi;
   wherein particles of said graphite powder have a size of 10–80 mesh, less than 10 wt % of the particles of the graphite powder are larger than 40 mesh, and the remaining particles of the graphite powder have a size of 40–80 mesh;
   wherein said vinyl ester is selected from the group consisting of bisphenol-A epoxy-based methacrylate, bisphenol-A epoxy-based acrylate, tetrabromo bisphenol-A epoxy-based methacrylate, and phenol-novolac epoxy-based methacrylate.

2. The method as claimed in claim 1, wherein said mixture in step (a) further comprises a free radical initiator in an amount of 1–10% based on the weight of said vinyl ester resin.

3. The method as claimed in claim 2, wherein said free radical initiator is selected from the group consisting of peroxide, hydroperoxide, azonitrile, redox systems, persulfates, and perbenzoates.

4. The method as claimed in claim 3, wherein said free radical initiator is t-butyl peroxybenzoate.

5. The method as claimed in claim 1, wherein said mold releasing agent is wax or metal stearate.

6. The method as claimed in claim 5, wherein said mold releasing agent is metal stearate.

7. The method as claimed in claim 1, wherein said mixture in step a) further comprises a low shrinking agent in an amount of 5–20%, based on the weight of said vinyl ester resin.

8. The method as claimed in claim 7, wherein said low shrinking agent is selected from the group consisting of styrene-monomer-diluted polystyrene resin, copolymer of styrene and acrylic acid, poly(vinyl acetate), copolymer of vinyl acetate and acrylic acid, copolymer of vinyl acetate and itaconic acid, and terpolymer of vinyl acetate, acrylic acid and itaconic acid.

9. The method as claimed in claim 8, wherein said low shrinking agent is styrene-monomer-diluted polystyrene resin.

10. The method as claimed in claim 1, wherein said mixture instep a) further comprises a tackifier in an amount of 1–10%, based on the weight of said vinyl ester resin.

11. The method as claimed in claim 10, wherein said tackifier is selected from the group consisting of alkaline earth metal oxides, alkaline earth metal hydroxides, carbodlimide, aziridines, and polyisocyanate.

12. The method as claimed in claim 11, wherein said tackifier is calcium oxide or magnesium oxide.

13. The method as claimed in claim 1, wherein said solvent is selected from the group consisting of styrene monomer, alpha-methyl styrene monomer, chloro-styrene monomer, vinyl toluene monomer, divinyl toluene monomer, diallylphthalate monomer, and methyl methacrylate monomer.

14. The method as claimed in claim 13, wherein said solvent is styrene monomer.

15. The method as claimed in claim 1, wherein said vinyl ester resin has a molecular weight of 500–10000.

16. The method as claimed in claim 1, wherein said vinyl ester resin is phenol-novolac epoxy-based methacrylate.

* * * * *